United States Patent [19]

Karras et al.

[11] 4,247,830

[45] Jan. 27, 1981

[54] PLASMA SPRAYED WICKS FOR PULSED METAL VAPOR LASERS

[75] Inventors: Thomas W. Karras, Berwyn; Carl E. Anderson, Wayne, both of Pa.

[73] Assignee: General Electric Company, Philadelphia, Pa.

[21] Appl. No.: 959,035

[22] Filed: Nov. 8, 1978

[51] Int. Cl.³ ............................................. H01S 3/02
[52] U.S. Cl. ........................ 331/94.5 D; 331/94.5 G
[58] Field of Search ................... 331/94.5 D, 94.5 G, 331/94.5 PE

[56] References Cited

U.S. PATENT DOCUMENTS

| 3,654,567 | 4/1972 | Hodgson | 331/94.5 G |
| 3,863,178 | 1/1975 | Ferrar | 331/94.5 G |

Primary Examiner—William L. Sikes
Attorney, Agent, or Firm—Allen E. Amgott; Raymond H. Quist

[57] ABSTRACT

Improved wicks for recirculating condensed vapor back to the discharge zone of a metal vapor laser are disclosed. The wicks are generally tabular in configuration and may be formed of sintered metal or of a metal substrate with a porous plasma sprayed layer thereon. Compatible wick metals are taught for use with different active vaporized metals.

8 Claims, 2 Drawing Figures

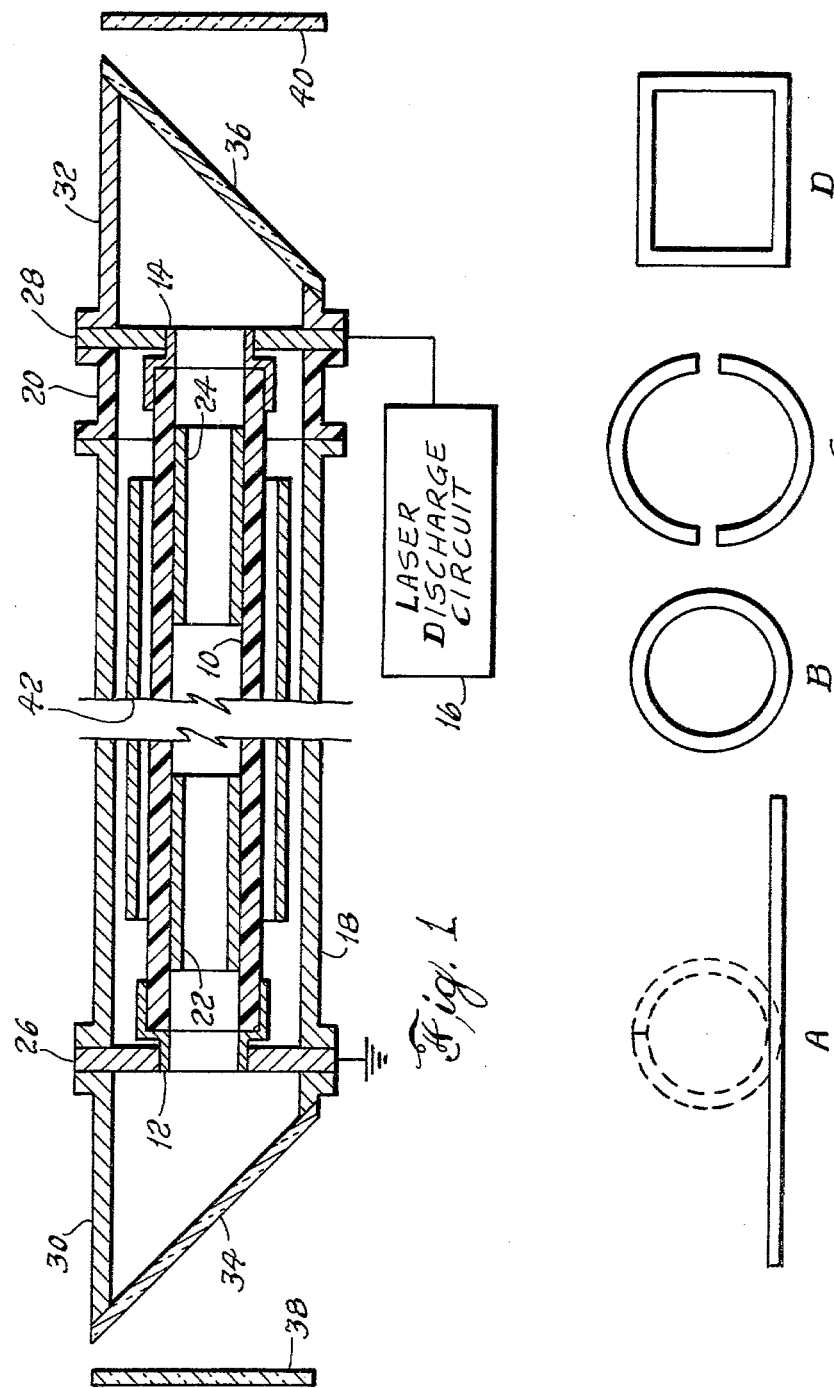

PLASMA SPRAYED WICKS FOR PULSED METAL VAPOR LASERS

BACKGROUND OF THE INVENTION

This invention relates generally to metal vapor lasers and more particularly to wicks used in such lasers for recirculation of condensed metal vapor.

In operation of a metal vapor laser some of the metal vapor tends to migrate from the hot discharge zone at the center to the cooler areas at the ends where it condenses. It has previously been disclosed to use a wick structure such as is used in a heat pipe to recirculate the liquid metal back to the central zone where it will revaporize (see U.S. Pat. No. 3,654,567).

SUMMARY OF THE INVENTION

Wicks to be used to convey condensed vapor back to the discharge zone of a metal vapor laser where it will revaporize are disclosed. The wicks have a porous plasma sprayed layer of a suitable metal on a substrate of a compatible metal. The wick may alternatively be formed from sintered metal.

BRIEF DESCRIPTION OF THE DRAWING

FIG. 1 illustrates in section the overall structure of a laser including an embodiment of the invention; and FIG. 2 A-D illustrates wick cross-sections and fabrications.

DESCRIPTION OF THE PREFERRED EMBODIMENT

Referring to FIG. 1, discharge tube 10 is impervious, non-electrically conducting, and of a high-density refractory material, preferably alumina, although zirconia, beryllia, or quartz may be used. Electrodes 12 and 14, at each end of discharge tube 10, are provided for initiating discharges therebetween responsive to laser discharge circuit 16. Laser discharge circuit 16 is not essential to the understanding of this invention and is only included to illustrate a complete laser system. A suitable circuit is disclosed in U.S. Patent Application Ser. No. 804,769, filed June 8, 1977, entitled Discharge-Heated Copper Vapor Laser, which is assigned to the assignee of the present invention.

Housing 18, which may be stainless steel or copper, encloses discharge tube 10. Insulating member 20, which may be alumina, provides insulation between electrodes 12 and 14.

In accordance with the invention, positioned within and near the ends of discharge tube 10 are wicks 22 and 24. Each wick is normally displaced inwardly a short distance from the end of tube 10 to avoid an electrical connection to electrodes 12 and 14, although under some conditions they may be in contact and the wicks may act as electrodes. Electrode holders 26 and 28 make a mechanical and electrical connection to electrodes 12 and 14 respectively.

End sections 30 and 32 have windows 34 and 36, respectively, sealed to them. Mirrors 38 and 40 are provided outside windows 34 and 36 respectively.

In operation, a discharge between electrodes 12 and 14 through an inert gas, such as helium or neon, produces a vapor by heating a vapor source. Thermal shield 42 is employed to maintain the discharge zone of the discharge tube 10 at the desired temperature and the inside end of each wick at a temperature sufficiently high so that they might act as the source of vapor. The outside ends of the wicks are so placed with respect to the thermal shield so that they are sufficiently cool to prevent significant vaporization but not so cold that any condensed vapor will solidify.

Vapor which escapes from the discharge tube 10 and moves in the direction of windows 34 and 36 tends to condense on the ends of wicks 22 and 24 which are most distant from the discharge zone, i.e. the cooler ends. The condensate moves along wicks to the ends nearest the discharge zone where the higher temperature causes it to evaporate. This recirculation minimizes depletion of vapor in the discharge zone—thereby extending the period over which the laser will operate in the desired fashion.

The mode of operation must not be similar to a heat pipe, however. In that mode large heat flux would be needed to maintain the temperature gradient in the wicks. There should consequently be a buffer gas having a pressure greatly exceeding that of the vapor pressure of the material being transported to restrict the transported material which can diffuse through the buffer. (The gas pressure should be at least three times higher than the vapor pressure.) The length of the wick needed will thus be partially controlled by this buffer since it must be sufficient to insure that almost all of the diffusing atoms will hit the wick walls before leaving the inside of the wick structure.

Wicks 22 and 24 may be thin porous shells as in FIG. 2B typically 1 mm (0.04 in) thick and 18 cm long (7 in) machined out of sintered metal. The grain size used has generally been about 5 microns giving 20%–30% porosity. Because of the requirement that the laser material wet the wick and the high temperatures involved, only specific materials are suitable for the wick. Tungsten, molybdenum, and tantalum are suitable for the copper and gold vapor lasers; nickel and stainless steel for the lead and bismuth vapor lasers, and stainless steel for the barium vapor laser.

A wick shell thickness of about 1 mm has been used. Too thick a shell will not be able to sustain the temperature differences needed between the two ends of each wick without unacceptable heat flow, particularly when a high conductivity material like copper fills the wick. Thinner shell walls will not have sufficient structural integrity.

Shapes similar to those shown in FIG. 2B or 2D can be easily produced by machining.

Wicks 22 and 24 may alternately have a thin porous plasma sprayed inner layer on a suitable substrate. The plasma sprayed layer acts as the wick. Because of the typically high temperatures involved in laser operation, as well as the need for "wetting", only certain materials are suitable for use in the wick. Substrate materials which may be employed include: tungsten, molybdenum, tantalum, nickel, nichrome and stainless steel. The plasma sprayed materials which may be used are: Tungsten, for the copper and gold vapor lasers, nickel and stainless steel for the lead and bismuth lasers, and stainless steel (probably also tungsten and nickel) for the barium laser.

The plasma sprayed material which is selected must also be compatible with the substrate material. Thus a plasma sprayed tungsten layer may be used with a substrate of tungsten, molybdenum, or tantalum. A stainless steel or nickel sprayed layer may be applied to nichrome or nickel substrate.

Referring to FIG. 2 A–D, the wick configuration may be cylindrical as in FIG. 2 A–C or have a rectangular or other cross-section. Because of the current sizes of lasers and plasma spraying equipment, it is not presently practical to apply a plasma spray to the inner surface of a configuration such as FIG. 2 B or D. Wicks have been made successfully using the FIG. 2A configuration which is bent to the desired cross-section after the plasma sprayed layer has been applied. Substrate thicknesses of between 0.125 mm (0.005 inches) and 0.25 mm (0.010 inches) with plasma sprayed layers applied thereon of from 0.125 mm (0.005 inches) to 0.25 mm (0.010 inches) have been fabricated. The limitation on thickness results from the need to have satisfactory wicks after bending. Too thick a layer will crack. As the sprayed layer is made thinner, it can become discontinuous, so there is also a practical limit to how thin the layer should be.

The FIG. 2C configuration is also readily fabricated. A substrate cylinder is cut in half, sprayed and then rejoined.

Although particular embodiments of wicks for metal vapor lasers have been illustrated and described, it will be obvious that changes and modifications can be made without departing from the spirit of the invention and the scope of the appended claims.

We claim:

1. In a metal vapor laser having a central discharge zone defined by a longitudinally extending, non-electrically conducting wall with an electrode at each end, the improvement comprising:
   a longitudinally extending wick element at each end of said discharge zone; and
   each of said wick elements configured to have its outer surface in contact with said wall and having at least a porous inner surface layer.

2. A metal vapor laser in accordance with claim 1 wherein:
   each of said wick elements has a porous plasma sprayed layer on a substrate.

3. In a metal vapor laser having a central discharge zone with an electrode at each end, an improved wick at each end of the discharge zone for recirculating condensed vapor to the discharge zone comprising:
   a metal tube having at least a porous surface layer thereon.

4. A metal vapor laser in accordance with claim 3 wherein:
   said porous surface layer is plasma sprayed.

5. In a metal vapor laser having a central discharge zone with an electrode at each end, an improved wick at each end of the discharge zone for recirculating condensed vapor to the discharge zone comprising:
   a substrate from the group consisting of: nichrome nickel and stainless steel; and
   a porous plasma sprayed layer of nickel or stainless steel on said substrate.

6. In a metal vapor laser having a central discharge zone with an electrode at each end, an improved wick at each end of the discharge zone for recirculating condensed vapor to the discharge zone comprising:
   a substrate from the group consisting of: tungsten, molybdenum, and tantalum; and
   a porous plasma sprayed layer on said substrate, said layer from the group consisting of: tungsten, molybdenum, tantalum, tungsten carbide, and tantalum carbide.

7. In a lead or bismuth vapor laser having a central discharge zone with an electrode at each end, an improved wick at each end of the discharge zone for recirculating condensed vapor to the discharge zone comprising:
   a sintered tube of a metal from the group consisting of: stainless steel and nickel.

8. In a copper or gold vapor laser having a central discharge zone with an electrode at each end, an improved wick at each end of the discharge zone for recirculating condensed vapor to the discharge zone comprising:
   a sintered tube of a metal from the group consisting of: tungsten, molybdenum, tantalum, tungsten carbide, and tantalum carbide.

* * * * *